F. GERSTEIN.
AUTOMOBILE INDICATOR.
APPLICATION FILED JUNE 28, 1919.

1,359,356.

Patented Nov. 16, 1920.

INVENTOR
FRANK GERSTEIN

UNITED STATES PATENT OFFICE.

FRANK GERSTEIN, OF TORONTO, ONTARIO, CANADA.

AUTOMOBILE-INDICATOR.

1,359,356.  Specification of Letters Patent.  Patented Nov. 16, 1920.

Application filed June 28, 1919. Serial No. 307,458.

*To all whom it may concern:*

Be it known that I, FRANK GERSTEIN, of the city of Toronto, in the county of York, in the Province of Ontario, Canada, have invented certain new and useful Improvements in Automobile-Indicators, of which the following is the specification.

My invention relates to improvements in automobile indicators and the object of the invention is to devise a simple device whereby the speed of travel of an automobile may be roughly indicated so that the operator will know whether the speed of the car is approaching the speed limit or not when traveling on level road and it consists essentially of the following arrangement and construction of parts as hereinafter more particularly explained.

In the drawings like characters of reference indicate corresponding parts in the various figures.

Figure 1:
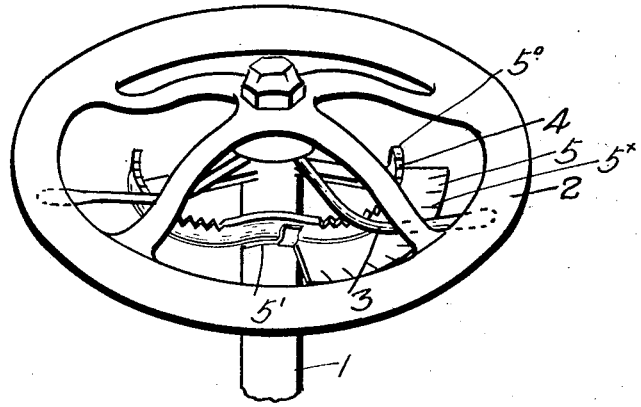
Figure 1, is a perspective view of a steering wheel and the upper portion of a steering post showing the gas lever and my device co-acting therewith.
Figure 2:
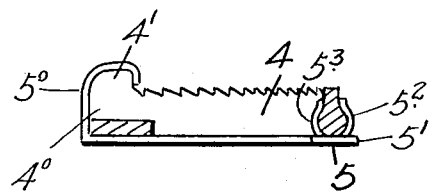
Fig. 2, is a sectional detail of the rack co-acting with the gas lever and my indicating device connected thereto.
Figure 3:
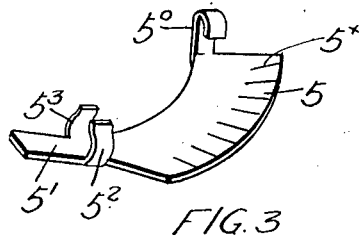
Fig. 3, is a perspective detail of my indicating device.

1 indicates the steering post of an automobile, 2 the steering wheel, 3 the gas lever and 4 the rack which is carried by the steering post and which co-acts with the gas lever. 5 indicates an arc-shaped plate, upon the outer edge of which is inscribed suitable graduation marks $5^x$. One end of the plate 5 is provided with an upwardly extending hook member $5^o$ which passes upwardly against the end of the rack at $4^o$ so as to hook over the enlargement $4'$ which is formed at the end of the rack and which forms a stop for the gas lever. The opposite end of the plate is provided with a tongue $5'$ which bears against the lower face of the rack, such tongue being provided with opposing curved spring fingers $5^2$ and $5^3$, which fit around the curved sides $4'$ and $4^2$ of the rack 4 thereby securely holding the plate in position upon the rack.

It may be stated that the speed of travel of an automobile is roughly proportionate to the amount of gas used and, therefore, if the gas lever is set to any desired position indicated by the graduation marks $5^x$ upon the plate 5 that the amount of gas will be fed to the engine which will give a certain travel speed, the less gas, of course, fed to the engine the lower the speed and the greater the amount the greater the speed.

It will, of course, be understood that my device is only applicable to indicate the speed when an automobile is traveling on a level road, such as the average city streets and is not intended for country use where the road assumes different grades, the purpose of my device being merely to roughly indicate to the operator whether he is approaching the speed limit allowed in the city in which he is traveling.

What I claim as my invention is:

1. A speed indicator comprising a graduated plate and means for detachably securing the plate to the lower edge of the gas lever rack.

2. A speed indicating device comprising a graduated plate having a hook member at one end adapted to extend over the stop projection at the end of the gas lever rack, and means for connecting the opposite end of the plate to the rack.

3. A speed indicating device comprising a graduated plate having a hook member at one end adapted to extend over the stop projection at the end of the gas lever rack, and opposing curved spring fingers extending upwardly from the opposite end of the plate and designed to grip the sides of the gas lever rack.

FRANK GERSTEIN.